March 28, 1961   W. H. MILLS   2,976,900
SAW CHAINS
Filed July 21, 1958
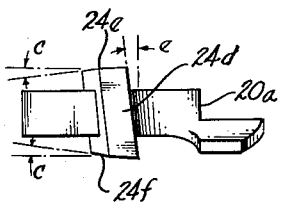
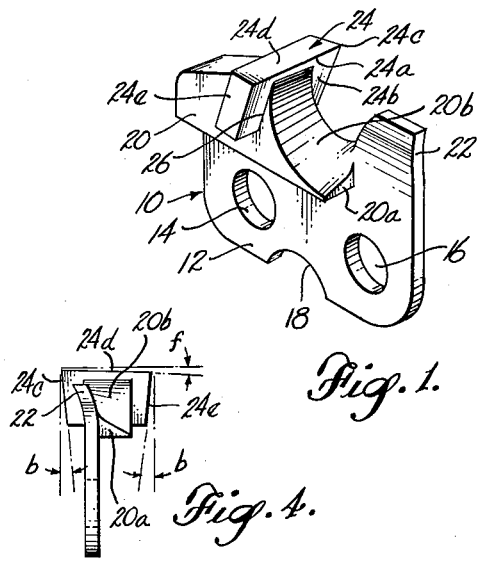
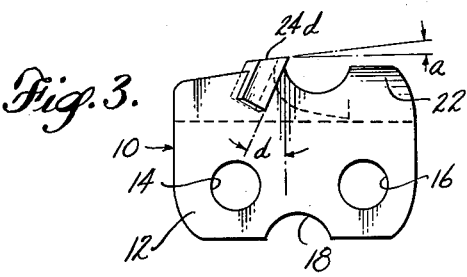
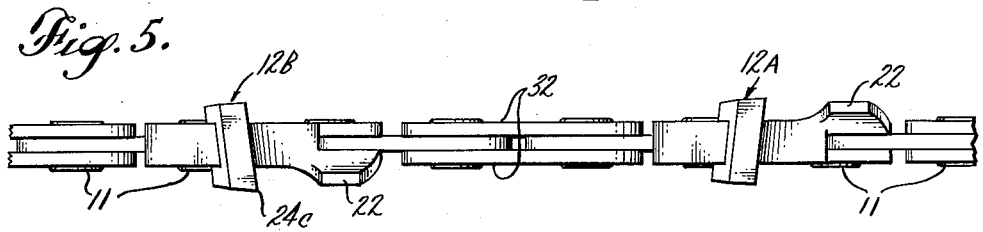
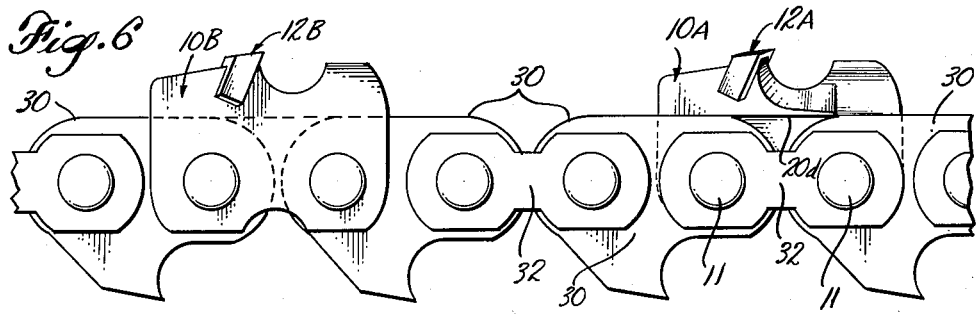
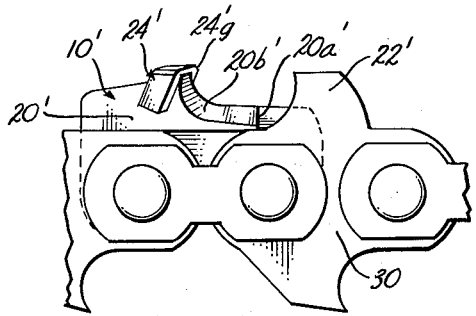
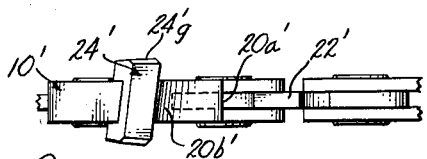
INVENTOR.
WADE H. MILLS
BY
ATTORNEYS

2,976,900

SAW CHAINS

Wade H. Mills, Kosmos, Wash.

Filed July 21, 1958, Ser. No. 749,855

9 Claims. (Cl. 143—135)

This invention relates to improvements in chain saw chains and particularly concerns new and improved cutting links and combined cutting and depth gauge links for such saw chains. The invention is herein illustratively described by reference to the presently preferred form thereof; however, it will be recognized that certain modifications and changes therein with respect to details may be made without departing from the essential features involved.

An object hereof is the provision of a saw chain adapted to cut rapidly and in a stable, smooth manner, overcoming the tendency of many fast-cutting chains to bite and dig into the wood in a rather uncontrolled manner.

Another object is the provision of an improved saw chain adapted to the use of hardened replaceable routers or cutter bits, as cutter block inserts, which are of such form that it becomes commercially practical to make them of tungsten carbide or other very hard material requiring only occasional removal for sharpening.

Still another object is an improved rapid-cutting chain featuring a novel router block construction permitting the cutting edge of the router bit to extend substantially the full width of the kerf so that each router performs substantially a full cut instead of cutting across only approximately half the kerf as in conventional designs. This is made possible by employing a cutter block design which effectively ejects and carries the shavings ahead of the router until they can be discharged from the kerf, since they are not readily by-passed by a full-width router as is done in the case of conventional routers of narrow design.

A further object is an improved saw chain which will cut smoothly and rapidly for ripping as well as cross-cut applications.

As herein disclosed, the improved chain comprises router links, each having an upstanding portion which carries a relatively wide and elongated block extending lengthwise of the link, and a transversely disposed router bit or tooth mounted on such block, preferably as a removable insert, situated intermediate the ends of the block. A distinguishing feature is the formation of the forward portion of the router block to guide and retain shavings ahead of the router. Such forward block portion comprises a guide face which is longitudinally concave, sloping downwardly and forwardly in the longitudinal sense and with progressively decreasing angle, from a rearward location just beneath the cutting edge of the router, and sloping transversely from one side to the other of the block. This guide face extends well forwardly of the router and may extend substantially to the forward end of the link, although it is not required to do so. The forwardly and outwardly inclined router bit is set with its cutting edge at a slight angle to a line perpendicular with the travel, with its leading corner on that side of the link which corresponds to the high side of the guide face and with its forward face approximately in the plane of the pivot axis of the rear pivotal connection for the cutter link carrying such router. The depth gauge may be on the router link, in which event its upper end portion is preferably bent laterally toward the last-mentioned side of the link in order to improve stability and decrease resistance to ejection of shavings from the router into the region ahead of the router. If desired, the depth gauge may be on a separate, forwardly located link.

These and other features, objects and advantages of the invention will become more fully evident to those skilled in the art on the basis of the following description by reference to the accompanying drawings.

Figure 1 is a perspective view of an improved router link or block seen from a forward aspect, embodying features of the invention.

Figure 2 is a top view of an alternately positionable link adapted to be mounted in the saw chain as an immediately preceding or succeeding link relative to one such as that in Figure 1.

Figure 3 is a side view of the link in Figure 2.

Figure 4 is a front end view of the latter link.

Figure 5 is a top view of a stretch of chain illustrating the relationship of two succeeding router links.

Figure 6 is a side view of the chain stretch shown in Figure 5.

Figure 7 is a side view of a short length of chain incorporating a modified router link, with a depth gauge on a separate link.

Figure 8 is a top view of the chain section shown in Figure 7.

Referring to Figures 1 to 6, inclusive, the router or cutter link 10 comprises a generally flat upstanding plate-like member 12 of generally rectangular proportions having holes 14 and 16 in the opposite lower corners thereof to receive rivets or other pivotal securing elements 11 linking the same to adjacent links of the saw chain. A clearance notch 18 may be provided in the lower edge intermediate the ends of the link plate 12 for purposes related to the specific means employed for driving the chain, which are not pertinent herein.

The link plate 12 carries on one side a relatively wide and elongated block 20 extending lengthwise along the upper portion thereof, and in this instance a depth gauge or rider 22 projecting from the link plate as an upward extension of the forward end portion thereof. A transversely disposed router bit or tooth 24 is mounted on the block 20, preferably as a removable insert received in a slot 26 formed at an intermediate location along the block and silver-soldered or otherwise secured in place therein. The router bit preferably comprises a relatively thick, flat plate which is set on an incline to the travel of the link, with its upper edge forward end preferably its forward face 24b generally aligned with the rear pivot 11 for the cutter link. The forward upper edge 24a, which serves as the cutting edge, is transversely inclined. The corner 24c then becomes the leading corner or toe of the router. This corner not only slightly leads but is elevated slightly above the opposite forward corner of the bit by virtue of a slight transverse slope of the top face 24d, represented by angle $f$ (Figure 4). The top face 24d is substantially flat and slopes downwardly and to the rear by a small acute angle $a$ relative to the line of travel (Figure 3). The end faces 24e and 24f, respectively, are inclined downwardly and inwardly at an angle $b$ in relation to a vertical plane parallel to the general plane of the link plate 12, and rearwardly and inwardly at an angle $c$ with respect to such plane as seen in Figures 4 and 2, respectively. The downward and rearward slope angle of the front face 24b of router bit 24 is designated $d$ and the transverse angle between the front face and a transverse line perpendicular to the line of travel is designated $e$. On alternate cutting links the slopes and positionings of the elements and faces of the cutting bit are reversed as shown best in Figures 5 and 6.

The cutting edge 24c is preferably substantially straight and extends nearly the full desired width of the kerf. Slight canting of the cutter links during cutting, with successive links leaning oppositely in a lateral sense is produced by the transverse slope e, as desired for return-stretch clearance, thereby preventing a completely full-width cut by each router.

Preferably the cutting bit 24 is formed of tungsten carbide or other very hard material requiring little or no sharpening. If desired, the bit may be formed of steel as an integral part of the block 20 and hardened. The block 20 may be separate from the link plate 12 and suitably mounted thereon, or may be formed integrally therewith as shown. In the illustrated embodiment the tungsten carbide bit 24 is silver-soldered or otherwise secured to the block 20 after reception in the slot 26 therein.

The illustrated block 20 extends rearwardly from the cutting bit 24 substantially to the rear edge of the link plate 12 as shown best in Figure 3, and preferably slopes rearwardly and downwardly from its line of contact with the back side of the bit near the upper edge of the latter. The rear upper corner of the block 20 is preferably rounded.

A highly important feature of this improved router link is the formation of the block 20 at a location forwardly of the cutting bit 24. While the block may extend to the forward edge of the link plate 12 it is convenient and in fact preferred to terminate it at a location which aligns vertically substantially with the rear edge of the depth gauge 22. The forward end of the block 20 may be terminated in a rounded form or simply in the blunt end face 20a as shown. Between this forward terminus of the block and the front face 24b of the cutting bit the block is formed with a concave-upward guide face 20b by which the shavings produced by the router 24 are directed in such a manner as to flow freely forwardly of the router bit and past the depth gauge 22 into the spaces defined between the particular cutting link and the next preceding cutting link ahead of it in the chain. From a point just at or below the cutting edge 24c the guide face 20b extends downwardly and forwardly, preferably at a progressively decreasing slope angle which initially approaches 90 degrees to the line of travel and finally, near the forward edge 20a, approaches parallelism with the longitudinal line of travel of the link. This configuration of hte face 20b applies along the overhanging or free edge of the block 20, that is the edge which projects laterally the greatest distance from the side of the link plate 12. The opposite edge of the block 20 is substantially in the plane of the opposite face of the link plate 12, and at this edge the curvature initially follows the curvature of the first-mentioned edge in progressing forwardly from the router bit 24, but upon approaching the depth gauge 22 the edge curves upwardly in order to merge with the vertical rearward edge of the depth gauge. This latter edge of the block, therefore, is preferably in the form of a concave upward arc which may be circular or of some other curved form. The forward end 20a of the guide face 20b is situated well forwardly of the cutting bit 24 in all examples, and in the event the depth gauge 22 is not mounted on the cutting link, but on a link ahead of it, substantially the same longitudinal curvature of the guide face 20b is provided along both edges thereof since one edge is no longer required to merge with a depth gauge.

In addition to the longitudinal slope of the guide face 20b, such face is inclined laterally and downwardly in the direction away from that side of the link which corresponds to that occupied by the leading bit corner 24c. In Figure 1, for example, the transverse slope is from the right downwardly toward the left.

With the depth gauge 22 mounted on the forward upper portion of the link plate 12 in the manner illustrated, it is preferred that the depth gauge, which comprises a relatively flat plate-like projection, preferably formed of the same stock and of the same thickness as the link plate 12 and as an integral part of such line plate, be curved laterally outwardly away from the same side as that occupied by the ridge or high side edge of the guide face 20b.

As shown in Figures 5 and 6, the incline angles of the router and block surfaces, the side of the overhang of the block, and the side of the link toward which the depth gauge 22 is curved are all reversed on successively adjacent cutter links. Thus, one link 12A in Figure 5 has its leading corner and depth gauge deflection on the left side of the chain whereas the next succeeding link 12B has its leading corner 24c and depth gauge deflection on the right side of the chain, looking down upon the top stretch of chain shown in the figure. In this instance the block overhang of cutter link 12A is on the right side whereas that of cutter link 12B is on the left. The lower face 20d of the overhanging block serves as a stop surface for the connecting drive links 30 limiting backward tilting of the cutter link relative to the line of travel. The drive links 30, pivotally connected by rivets 11 or other elements to respectively opposite ends of the cutter links 10, are in turn interconnected pivotally by pairs of spacer links 32. The pivots 11 of each cutter link are also interconnected by a single spacer link 32 placed on the side of the drive links 30 opposite from the link plate 12 so as to provide symmetry in the chain. In certain cases raker teeth or links may be provided. These and other aspects of the chain proper, apart from the cutter links therein, toward which the present invention is primarily directed, may vary and are not presently pertinent.

Referring to Figures 7 and 8, it will be evident that the depth gauge 22' has been removed from the cutter link 10' and mounted upon the next preceding link 30 of the chain. Also, the upper side edges of the cutter bit 24' have been chamfered at 24g' in order to provide a somewhat stabler tooth with less tendency to bite. In this instance, because of the depth gauge's removal, the end face 20a' at the forward end of the block 20' has been extended the full width of the block, and the transverse slope and longitudinal curvature of the guide face 20b' has been carried throughout substantially the full width and length of such guide face. The depth gauge 22' in this instance is preferably flat or planar and need not be curved laterally in the manner previously described, although such curvature may be employed if desired. In this instance the depth gauge is mounted on a transversely centered drive link 30 but it will be apparent that it may also be mounted on one or both of the coupling links 32 of either pair of coupling links connected between any two of the successively adjacent drive links 30 between cutter links. It is desirable, however, that the depth gauge be located close to the cutter bit or cutter link in order to stabilize the chain against back tilting of the cutter link under load. For that reason the embodiment illustrated in Figures 1 to 6, inclusive, is the preferred embodiment, wherein the depth gauge is mounted directly on the link or block which carries the router bit.

While certain variations are permissible in the details of design of the novel saw chain and cutter link, certain proportions and relationships of the elements involved therein are preferred. In the embodiment shown in Figures 1 to 6, inclusive, the approximate limits on design variations for the controlling features of the cutter are as follows: The angle $a$ representing the back slope of the top face of the bit should not exceed about 15 degrees and should not be less than about 5 degrees. The same limits apply to the side relief angle $b$ and to the end relief angle $c$. The front face vertical slope angle $d$ is preferably in the vicinity of 30 degrees whereas the transverse slope of the front face is preferably between the limits of 5 degrees and 20 degrees. In addition, it is desirable for effective cutting that the top face of the bit, designated 20g, be sloped from that side which has the forward corner 24c, downwardly toward the opposite side at an angle f between one-half degree and 2 degrees. The transverse slope of the guide face 20b is preferably a minimum of about 15 degrees and a maximum of about 25 degrees. The point or line at which the guide face 20b meets the front face 24b of the bit 24 is approximately 0.075 inch to 0.15 inch below the cutting edge 24c.

Having described the invention in its presently preferred form it will be evident that certain modifications and changes therein may be made within the scope of the novel subject matter involved.

I claim as my invention:

1. A chain saw chain comprising cutter links and links serially interconnecting said cutter links in successive spaced relationship, said cutter links comprising an upstanding link plate, a relatively wide and elongated block carried by said link plate and extending lengthwise along the upper portion thereof, a transversely disposed router carried by said block and projecting transversely beyond the opposite sides thereof, at a location intermediate the ends of such block, said router having an elongated cutting edge extending across substantially the full width of the router at the upper forward edge, said block having a portion extending forwardly from the router, with an upper guide face extending across substantially the width of said forward block portion which curves downwardly and forwardly at progressively decreasing longitudinal slope angle from its rear, upper end located in the vicinity of said cutting edge to a forward end located materially forwardly of and beneath the cutting edge.

2. A chain saw chain comprising cutter links and links serially interconnecting said cutter links in successive spaced relationship, said cutter links comprising an upstanding link plate, a relatively wide and elongated block carried by said link plate and extending lengthwise along the upper portion thereof, a transversely disposed router carried by said block and projecting transversely beyond the opposite sides thereof, at a location intermediate the ends of such block, said router having an elongated cutting edge extending across substantially the full width of the router at the upper forward edge, said block having a portion extending forwardly from the router, with an upper guide face extending across substantially the width of said forward block portion which curves downwardly and forwardly at progressively decreasing longitudinal slope angle from its rear, upper end located in the vicinity of said cutting edge to a forward end located materially forwardly of and beneath the cutting edge, said guide face having a transverse slope downwardly substantially from a first side thereof to the opposite side.

3. The saw chain defined in claim 2, wherein the cutter link further comprises a depth gauge projecting upwardly therefrom substantially in the general plane of the link plate and at the forward end thereof to a height slightly below the top of the router, an upper end portion of said depth gauge being deflected transversely toward the side of the link corresponding to the high side of the guide face.

4. The saw chain defined in claim 2, wherein the longitudinal slope of the guide face at its rearward end is approximately vertical and that at its forward end is approximately horizontal.

5. The saw chain defined in claim 3, wherein the transverse slope of the guide face is in the range between about 15° and about 25°.

6. The saw chain defined in claim 5, wherein the cutter link further comprises a depth gauge projecting upwardly therefrom substantially in a general plane of the link plate and at the forward end thereof to a height slightly below the top of the router, an upper end portion of said depth gauge being deflected transversely toward the side of the link corresponding to the high side of the guide face.

7. A chain saw chain comprising cutter links and links serially interconnecting said cutter links in successive spaced relationship, said cutter links comprising an upstanding link plate, having front and rear pivot elements near the lower edge thereof, a relatively wide and elongated block carried by said link plate substantially on one side thereof and extending lengthwise along the upper portion thereof, a transversely disposed router carried by said block and projecting transversely beyond the opposite sides thereof by substantially equal distances from opposite sides of the chain, at a location intermediate the ends of such block, said router having an elongated cutting edge extending across substantially the full width of the router at the upper forward edge, said router having a forward face inclined downwardly and to the rear generally in a plane which is substantially in alignment with the rear pivot element, said block having a portion extending forwardly from the router, with an upper guide face extending across substantially the width of said forward block portion which curves downwardly and forwardly at progressively decreasing longitudinal slope angle from its rear, upper end located in the vicinity of said cutting edge to a forward end located materially forwardly of and beneath the cutting edge, said guide face having a transverse slope downwardly substantially from a first side thereof to the opposite side.

8. The saw chain defined in claim 7, wherein the router block projects transversely from one side of the link plate and has a lower edge, links of the chain connected to said link plate having upper edges substantially abutted to said lower edge with the stretch of chain including such links extended straight.

9. A chain saw chain comprising cutter links and links serially interconnecting said cutter links in successive spaced relationship, said cutter links comprising an upstanding link plate, a relatively wide and elongated block formed integrally with said link plate and extending lengthwise along the upper portion thereof, a transversely disposed router bit substantially in the form of a flat plate-like member of a material which is hard in relation to said block and link plate, said block being slotted transversely and said bit being mounted in said slot and removably bonded therein, said bit projecting transversely beyond the opposite sides thereof, at a location intermediate the ends of such block, said router bit having an elongated cutting edge extending across substantially the full width of the router at the upper forward edge, said block having a portion extending forwardly from the router bit, with an upper guide face extending across substantially the width of said forward block portion which curves downwardly and forwardly at progressively decreasing longitudinal slope angle from its rear, upper end located in the vicinity of said cutting edge to a forward end located materially forwardly of and beneath the cutting edge, said guide face having a transverse slope downwardly substantially from a first side thereof to the opposite side.

References Cited in the file of this patent

UNITED STATES PATENTS

| | | |
|---|---|---|
| 323,602 | Shipe | Aug. 4, 1885 |
| 2,508,784 | Cox | May 23, 1950 |
| 2,583,243 | Tweedie | Jan. 22, 1952 |
| 2,664,120 | Hinkley | Dec. 29, 1953 |
| 2,744,548 | Stephenson et al. | May 8, 1956 |
| 2,747,623 | Cox | May 29, 1956 |
| 2,852,048 | Cox | Sept. 16, 1958 |
| 2,862,533 | Mall | Dec. 2, 1958 |

FOREIGN PATENTS

| | | |
|---|---|---|
| 1,102,721 | France | May 11, 1955 |
| 738,106 | Great Britain | Oct. 5, 1955 |